United States Patent Office 3,163,646
Patented Dec. 29, 1964

---

3,163,646
3-AMINOBENZOTRIAZINONES-(4)
Heinz Herlinger, Cologne-Flittard, Siegfried Petersen, Leverkusen, Ernst Tietze, Tubingen, and Friedrich Hoffmeister and Wolfgang Wirth, Wuppertal-Elberfeld, Germany, assignors to Farbenfabriken Bayer Aktiengesellschaft, Leverkusen, Germany, a corporation of Germany
No Drawing. Filed May 11, 1961, Ser. No. 109,239
Claims priority, application Germany, May 14, 1960, F 31,236
5 Claims. (Cl. 260—247.2)

This invention relates to the preparation of 3-aminobenzotriazinones-(4). More particularly, the present invention relates to novel 3-aminobenzotriazinones-(4) prepared by the cyclization of asymmetrically substituted hydrazides of 2-aminobenzoic acid.

Ring closure of o-anthranilic amides and derivatives thereof using nitrous acid have been suggested heretofore by I. G. Erickson in "The 1,2,3- and 1,2,4-Triazines, Tetrazines and Pentazines," Interscience Publishers, Inc., New York, 1956.

Cyclization of N-substituted o-aminocarboxylic acid amides has been found, however, to result in 3-substituted 4-oxo-3,4-dihydro-1,2,3-benzotriazines.

Further, $N^2$-substituted o-aminocarboxylic acid hydrazides have been found to yield N'-substituted benzimidazolones-(3) by ring closure with nitrous acid.

It has now been discovered, however, as indicated above, that novel and therapeutically valuable 3-aminobenzotriazinones-(4) can be prepared by treating o-aminocarboxylic acid hydrazides derived from N-amino compounds of secondary bases of the aliphatic, cycloaliphatic, aromatic and heterocyclic series, with nitrous acid or compounds which yield nitrous acid.

Thus, the invention comprises the formulation of 3-aminobenzotriazinones-(4) of the formula:

(I)
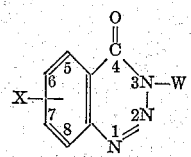

wherein W is a dialkylamino radical containing preferably 1 to 2 carbon atoms in each of the alkyl moieties or a morpholino, thiomorpholino, piperidino, or hexamethyleneimino radical; and X is a hydrogen, methyl, halogen, nitro, amino, or carbethoxyamido substituent.

Illustrative compounds encompassed by this general formula are 3-N-morpholino-benzotriazinone-(4), 3-N-piperidinobenzotriazinone - (4), 3-N-morpholino-7-methylbenzotriazinone - (4), 3-N-morpholino-6-bromobenzotriazinone - (4), and 3 - N - dimethylamino-6-nitrobenzotriazinone-(4).

The process of cyclization or ring closure comprises, as noted, reacting asymmetrically substituted hydrazides of 2-aminobenzoic acid of the formula:

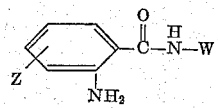

wherein W has the value assigned it above, and Z represents a hydrogen, nitro, halogen, or methyl substituent; with nitrous acid or a compound capable of yielding nitrous acid, in a reaction solution having a pH of 7 or less than 7. The desired pH is obtained by introduction of a suitable acid, normally a mineral acid such as hydrochloric acid into the reaction mixture prior to cyclization. Where Z is a nitro substituent, it can be readily converted, employing a suitable reducing agent such as, for example, powdered iron in water or the like, to an amino moiety which, in turn, may be conveniently modified by acylation with, for example, pyrocarbonic acid diethyl ester, to a carbethoxyamido radical.

The novel hydrazides of the present invention, which are as indicated employed as intermediates in the formation of the 3-aminobenzotriazinones-(4) of the invention, are encompassed by the general formula:

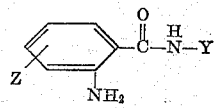

wherein Z has the value represented above; and Y is a member selected from the group consisting of morpholino, thiomorpholino, and piperidino radicals. Illustrative of these compounds are 4-(2'-aminobenzamino)-morpholine, 4-(2'-aminobenzamino) - thiomorpholine, 1-(2'-aminobenzamino)-piperidine, 4 - (2'-amino-4'-methylbenzamino)-morpholine, and 4 - (2' - amino - 5' - bromobenzamino)-morpholine.

The o-aminocarboxylic acid hydrazides employed in the aforesaid reaction are obtainable, preferably, by the reaction of isatoic acid anhydrides of the general formula:

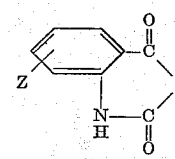

wherein Z has the value assigned to it above; with the N-amines, asymmetric (as.) dimethyl hydrazine, phenylmethyl hydrazine, N-aminomorpholine, dihydroxyethyl hydrazine, di-β-chloroethyl hydrazine, N-aminopiperidine, N-aminothiomorpholine, N - aminohexamethyleneimine, N-amino-N'-methylpiperazine or N-aminotriazole. The heterocyclic N-amino compounds may, in addition, be substituted in the carbon atoms of the heterocyclic nucleus by alkyl substituents containing from 1 to 2 carbon atoms each.

Compounds other than isatoic acid anhydrides may also be employed in the practice of the invention. Thus, other o-aminocarboxylic acids suitable for reaction with the aforesaid N-amino compounds are o-anthranilic acid, and nuclear substituted derivatives of o-anthranilic acid, benzidine-o,o'-dicarboxylic acid and 3-amino-2-naphthoic acid. The proposed nuclear substituents include lower alkyl, aryl, halogen, cyano, nitro, alkoxy (containing 1 to 7 carbon atoms) and phenoxy moieties. Further, sulfur-containing derivatives of o-anthranilic acid substituted by mercapto, alkylmercapto, or thioaryl groups may also be employed in addition to those o-aminocarboxylic acids containing sulfamido and substituted sulfamido groups.

It is noted that in forming the benzotriazinones of the invention, the intermediate hydrazides need not be separated from the reaction product mixture prior to cyclization thereof with nitrous acid of a compound capable of yielding nitrous acid. The 3-aminobenzotriazinones-(4) prepared as described herein are obtained either in crystalline form or can be isolated from the reaction mixture by extraction with standard organic solvents, e.g. ethanol, methanol, dioxane.

The 3-aminobenzotriazinones-(4) are valuable therapeutic compositions which, while evidencing significant analgesic activity, are well tolerated by the subject and are substantially free of such untoward side effects as the hemorrhaging frequently associated with such analgesic agents as aspirin and the like.

The following examples are further illustrative of the invention.

EXAMPLE 1

(a) *Preparation of the Compound, 4-(2'-aminobenzamino)-morpholine, of the Formula:*

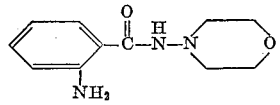

A suspension of 165 grams of isatoic acid anhydride and 105 grams of N-aminomorpholine in 1.2 liters of dioxane is boiled for three hours. The isatoic acid anhydride dissolves after a brief interval with evolution of carbon dioxide. Upon cooling, spontaneous crystallization occurs. The yield of product is 190 grams (86% by weight of the theoretical yield) having a melting point upon recrystallization from methanol of 207° C. to 208° C. Analysis calculated for $C_{11}H_{15}O_2N_3$ (221).

Calculated: C, 59.8%; H, 6.79%; N, 19.0%. Found: C, 59.7%; H, 6.6%; N, 18.9%.

(b) *Preparation of the Compound, 3-N-Morpholino-Benzotriazinone-(4), of the Formula:*

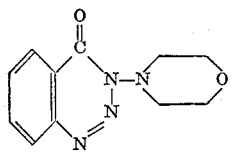

Forty-five grams of 4-(2'-aminobenzamino)-morpholine from part (a) above, are dissolved in 300 cc. of 10% hydrochloric acid. A solution of 14 grams of sodium nitrite in 100 cc. of water is then added dropwise at 0° C to 5° C. A white crystalline precipitate is immediately formed which is filtered off with suction and recrystallized from alcohol or dioxane to yield 41 grams (87% of the theoretical yield) of a product having a M.P. of 199° C. to 200° C. (with evolution of gas). Analysis calculated for $C_{11}H_{12}O_2N_4$ (232).

Calculated C, 59.8%; H, 6.79%; N, 19.0%. Found: C, 59.7%; H, 6.6%; N, 18.9%.

EXAMPLE 2

*Preparation of the Compound, 3-N-Thiomorpholino-Benzothiazinone-(4), of the Formula:*

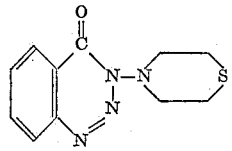

A solution obtained by boiling 15 grams of N-aminothiomorpholine (B.P. 195° C.–200° C.) and 21 grams of isatoic acid anhydride in 100 cc. of dioxane for a period of three hours, is further treated, without isolation of the reaction product, 4-(2'-amonobenzamino)-thiomorpholine, therefrom, with 100 cc. of ice water and 40 cc. of concentrated hydrochloric acid. A 10% sodium nitrite solution is added dropwise with cooling until the nitrite reaction is completed. A colorless product precipitates from the resulting reaction mixture having a melting point of 180° C. to 181° C. upon recrystallization from ethyl alcohol. Analysis calculated for $C_{11}H_{12}ON_4S$ (248).

Calculated: C, 53.2%; H, 4.84%. Found: C, 53.5%; H, 5.0%.

When isolated, the intermediate product, 4-(2'-aminobenzamino)-thiomorpholine melts at 203° C. to 204° C. upon recrystallization from alcohol. Analysis calculated for $C_{11}H_{15}ON_3S$ (237).

Calculated: C, 55.6%; H, 6.35%; N, 17.7%. Found C, 55.8%; H, 6.4%; N, 18.0%.

EXAMPLE 3

*Preparation of the Compound, 3-N-Piperidino-Benzotriazinone-(4), of the Formula:*

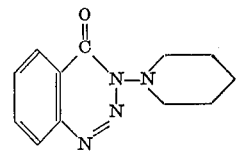

Following the procedure of Example 2, there is obtained from the reaction of isatoic acid anhydride and N-aminopiperidine, (the latter compound being substituted for the N-aminothiomorpholine of the aforesaid Example 2), a reaction solution containing the intermediate product 1-(2'-aminobenzamino)-piperidine. This reaction solution yields upon the addition of hydrochloric acid and sodium nitrite thereto colorless crystals of the final reaction product, 3 - N - piperidino - benzotriazinone - (4). Upon recrystallization from alcohol, the substance has a melting point of 146° C. to 148° C. Analysis calculated for $C_{12}H_{14}ON_4$ (230).

Calculated: C, 62.5%; H, 6.1%; N, 24.35%. Found: C, 62.2%; H, 6.3%; N, 24.0%.

The pure intermediate product, 1-(2'-aminobenzamino)-piperidine, when isolated, melts at 167° C.–169° C. after recrystallization from alcohol. Analysis calculated for $C_{12}H_{17}ON_3$ (219).

Calculated: C, 65.9%; H, 7.76%; N, 19.2%. Found: C, 65.8%; H, 7.9%; N, 18.2%.

EXAMPLE 4

*Preparation of the Compound, 3-Dimethylamino-Benzotriazinone-(4), of the Formula:*

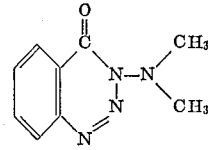

According to the process of Example 2, wherein asymmetric dimethyl hydrazine is substituted for the thiomorpholine of the initial reactants, the isatoic acid anhydride and as.-dimethyl hydrazine yield a reaction solution containing the intermediate hydrazide; ring closure being accomplished by treatment of this solution with nitrous acid to yield 3-dimethylaminobenzotriazinone-(4), which upon recrystallization from alcohol gives a melting point of 116° C. Analysis calculated for $C_9H_{10}ON_4$ (190).

Calculated: C, 56.8%; H, 5.25%. Found: C, 56.6%; H, 5.3%.

EXAMPLE 5

*Preparation of the Compound, 3-Hexamethylene Imino-Benzotriazinone-(4), of the Formula:*

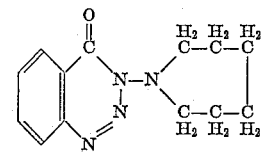

According to the procedure of Example 2 wherein N-amino-hexamethyleneimine (B.P. 175° C.–180° C.) is substituted for the morpholine employed therein; isatoic acid anhydride is reacted with said imine to provide a reaction solution containing the intermediate hydrazide, which is converted into 3-hexamethyleneimino-benzotriazinone-(4) with nitrous acid while cooling with ice. This compound has a melting point of 118° C. to 119° C. upon recrystallization from alcohol. Analysis calculated for $C_{13}H_{16}ON_4$ (244).

Calculated: C, 64.0%; H, 6.56%; N, 22.95%. Found: C, 63.95%; H, 6.65%; N, 22.95%.

EXAMPLE 6

*Preparation of the Compound, 3-Dimethylamino-6-Nitrobenzotriazinone-(4), of the Formula:*

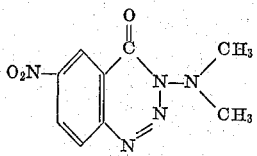

Equivalent amounts of 5-nitroisatoic acid anhydride and asymmetric dimethylhydrazine in dioxane are heated to boiling to yield a reaction solution containing the intermediate product, 5-nitro-2-aminobenzoic acid-as.-dimethylhydrazide. This compound is cyclized according to the procedure of Example 2, in an ice water solution acidified with hydrochloric acid, with sodium nitrite to form the final product, 3-dimethylamino-6-nitrobenzotriazinone-(4), having a melting point of 168° C. upon recrystallization from alcohol. Analysis calculated for $C_9H_9O_3N_5$ (235.2):

Calculated: C, 45.96%; H, 3.86%; N, 29.78%. Found: C, 46.02%; H, 4.12%; N, 29.88%.

The intermediate product, 5-nitro-2-aminobenzoic acid-as.-dimethylhydrazide, has a melting point upon recrystallization from acetic acid of 255° C. to 256° C. Analysis calculated for $C_9H_{12}O_3N_4$ (224.22):

Calculated: C, 48.21%; H, 5.39%. Found: C, 48.8%; H, 5.50%.

EXAMPLE 7

*Preparation of the Compound, 5-Bromo-3-Dimethylamino-Benzotriazinone-(4), of the Formula:*

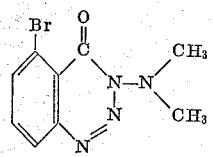

5-bromo-3-dimethylamino-benzotriazinone-(4) is obtained in a manner similar to the preceding example by the cyclization (ring closure) of 5-bromo-2-aminobenzoic acid-as.-dimethylhydrazide with nitrous acid. Melting point: 160° C. (recrystallized from alcohol). Analysis calculated for $C_9H_9ON_4Br$ (269).

Calculated: C, 40.2%; H, 3.35%; N, 20.8%. Found: C, 40.3%; H, 3.57%; N, 20.65%.

The 5-bromo-2-aminobenzoic acid-as.-dimethylhydrazide used as a starting compound is obtained from 5-bromoisatoic acid anhydride by boiling the latter with dimethylhydrazine in dioxane. Melting point: 168° C.–170° C. (recrystallized from alcohol). Analysis calculated for $C_9H_{12}ON_3Br$ (258).

Calculated: N, 16.3%. Found: N, 15.75%.

EXAMPLE 8

*Preparation of the Compound, 3-N-Morpholino-6 Nitrobenzotriazinone-(4), for the Formula:*

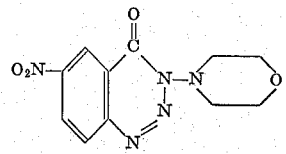

In accordance with the procedure described in Example 2, 5-nitroisatoic acid anhydride is reacted with an equivalent amount of N-aminomorpholine to form a reaction solution containing the intermediate product, 4-(2'-amino-5'-nitrobenzamino)-morpholine, which has a melting point of 300° C. when recrystallized from dimethylformamide. Its analysis when calculated for $C_{11}H_{14}O_4N_4$ (266.25) is:

Calculated: C, 49.62%, H, 5.30%; N, 21.04%. Found: C, 49.54%; H, 5.40%; N, 20.94%.

Ring closure of 4-(2'-amino-5'-nitrobenzamino)-morpholine is accomplished in a manner similar to Example 2 using nitrous acid. The final product, 3-N-morpholino-6-nitro-benzotriazinone-(4), upon reprecipitation from a concentrated hydrochloric acid-water mixture, has a melting point of 189° C.; analysis calculated for $C_{11}H_{11}O_4N_5$ (277.24):

Calculated: C, 47.65%; H, 4.00%; N, 25.26%. Found: C, 47.57%; H, 4.31%; N, 25.08%.

EXAMPLE 9

*Preparation of the Compound, 3-N-Morpholino-7-Methyl-Benzotriazinone-(4), of the Formula:*

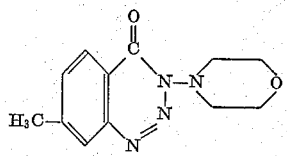

According to the procedure of Example 2, 4-methyl isatoic acid anhydride is reacted with N-amino morpholine to yield 4-(2'-amino-4'-methylbenzamino)-morpholine, M.P. 256° C.–257° C. (upon recrystallization from alcohol).

$C_{12}H_{17}O_2N_3$ (235.3). Calculated: C, 61.25%; H, 7.28%; N, 17.86%. Found: C, 61.29%, H, 7.61%; N, 17.31%.

Ring closure of 4-(2'-amino-4'-methylbenzamino)-morpholine is accomplished in a manner similar to that described in Example 2 using nitrous acid; the final product being, as a result, 3-N-morpholino-7-methyl-benzotriazinone-(4), M.P. 149° C.–150° C. (recrystallized from alcohol).

$C_{12}H_{14}O_2N_4$ (246.26). Calculated: C, 58.52%; H, 5.73%; N, 22.75%. Found: C, 58.57%; H, 5.84%; N, 22.70%.

EXAMPLE 10

*Preparation of the Compound, 3-N-Morpholino-6-Bromo-Benzotriazinone-(4), of the Formula:*

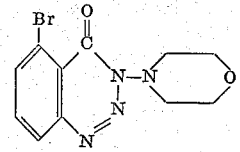

According to the procedure of Example 2, 6-bromo-isatoic acid anhydride is reacted with N-aminomorpholine to yield 4-(2'-amino-5'-bromobenzamino)-morpholine, M.P. 224° C.–225° C. (recrystallized from alcohol). $C_{11}H_{14}O_2N_3Br$ (300).

Calculated: C, 44.0%; H, 4.67%; N, 14.0%. Found: C, 43.94%; H, 4.86%; N, 14.05%.

Ring closure of 4-(2'-amino-5'-bromobenzamino)-morpholine is effected with nitrous acid in a manner similar to that described in Example 2 to yield 3-N-morpholino-6-bromo-benzotriazinone-(4), M.P. 214° C.–215° C. (recrystallized from dimethylformamide); $C_{11}H_{11}O_2N_9Br$ (311).

Calculated: C, 42.5%; H, 3.54%; N, 18.0%. Found: C, 42.47%; H, 3.51%; N, 18.50%.

EXAMPLE 11

*Preparation of the Compound, 3-Dimethylamino-6-Amino-Benzotriazinone-(4), of the Formula:*

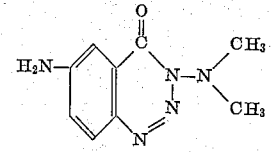

3-dimethylamino-6-nitro-benzotriazinone-(4) prepared as described in Example 6 is reduced by means of powdered iron in water to yield 3-dimethylamino-6-amino-benzotriazinone-(4), M.P. 192° C.–194° C. (recrystallized from chlorobenzene); $C_9H_{11}ON_5$ (205.2).

Calculated: C, 52.67%; H, 5.40%; N, 34.13%. Found: C, 52.57%; H, 5.46%; N, 34.10%.

EXAMPLE 12

*Preparation of the Compound, 3-Dimethylamino-6-Carbethoxyamido-Benzotriazinone-(4), of the Formula:*

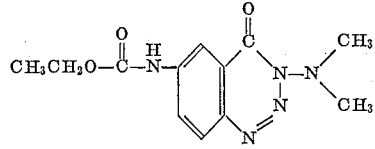

3-dimethylamino-6-amino-benzotriazinone-(4) of Example 11 is acylated with pyrocarbonic acid diethyl ester, M.P. 193° C.–194° C. (recrystallized from alcohol) to yield 3 - dimethylamino-6-carbethoxyamido-benzotriazinone-(4), M.P. 193° C.–194° C. (recrystallized from alcohol). $C_{12}H_{15}O_3N_5$ (277.3).

Calculated: C, 52.98%; H, 5.45%; N, 25.26%. Found: C, 52.43%; H, 5.55%; N, 25.48%.

What is claimed is:
1. A chemical compound of the formula:

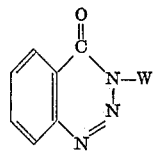

wherein W is a radical substituent selected from the group consisting of dialkylamino, wherein each of the alkyl substituents contains up to 2 carbon atoms, and morpholino, thiomorpholino, piperidino, and hexamethylene imino.

2. The chemical compound, 3-N-morpholino-benzotriazinone-(4).

3. The chemical compound, 3-N-piperidino-benzotriazinone-(4).

4. The chemical compound, 3-dimethylamino-benzotriazinone-(4).

5. The chemical compound, 3-hexamethylene imino-benzotriazinone-(4).

References Cited in the file of this patent
UNITED STATES PATENTS

| | | |
|---|---|---|
| 2,018,645 | Williams et al. | Oct. 22, 1935 |
| 2,786,838 | Skinner et al. | Mar. 26, 1957 |
| 2,843,588 | Lorenz | July 15, 1958 |
| 2,861,990 | Cleaver et al. | Nov. 25, 1958 |
| 2,949,465 | Lo | Aug. 16, 1960 |
| 3,014,906 | Gadekar et al. | Dec. 26, 1961 |

FOREIGN PATENTS

| | | |
|---|---|---|
| 1,121,055 | Germany | Jan. 4, 1962 |

OTHER REFERENCES

Erickson et al.: The 1,2,3- and 1,3,4-Triazines, Tetrazines and Pentazines (1956), pp. 21–27.

Heller: Jour. Prakt. Chem., vol. 111 (1925), pp. 36–53.

Heilbron et al.: J. Chem. Soc., vol. 127, 1925, pp. 2167–75.

Heyningen: Jour. Amer. Chem. Soc., vol. 77, pp. 6562–64 (1955).

Rinderspacher et al.: Helv. Chim. Acta., vol. 41, pages 22–5 (1958).